United States Patent [19]

Marozsan et al.

[11] Patent Number: 5,064,234

[45] Date of Patent: Nov. 12, 1991

[54] VACUUM NOZZLE AND CONDUCTANCE SENSOR

[75] Inventors: Andy Marozsan, Boca Raton; Robert Leon, Miami, both of Fla.

[73] Assignee: Motorola, Inc., Schaumburg, Ill.

[21] Appl. No.: 563,136

[22] Filed: Aug. 2, 1990

[51] Int. Cl.[5] .......................... B66C 1/02; B25J 15/06; B25J 19/02

[52] U.S. Cl. .................... 294/64.1; 294/907; 901/40; 901/46

[58] Field of Search .............. 294/64.1, 64.2, 907, 294/2, 65.5; 901/40, 46; 414/627, 737; 307/38, 39, 116

[56] References Cited

U.S. PATENT DOCUMENTS 4,667,997 5/1987 Udagawa et al. ............. 294/907 X
4,906,926 3/1990 Rogacki et al. ............... 294/907 X

FOREIGN PATENT DOCUMENTS 1296406 3/1987 U.S.S.R. ........................ 901/34
1328196 8/1987 U.S.S.R. ........................ 294/907

Primary Examiner—Johnny D. Cherry
Assistant Examiner—Dean J. Kramer
Attorney, Agent, or Firm—Vincent B. Ingrassia; Thomas G. Berry

[57] ABSTRACT

An apparatus capable of automated and/or robotic assembly, comprises a vacuum nozzle (100) capable of aspirating and securing an electrically conductive assembly component (114). The electrically conductive assembly component (114) is electrically coupled to an electric conductance sensor for detecting the presence of the electrically conductive assembly component (114) at the vacuum nozzle (100).

17 Claims, 2 Drawing Sheets

VACUUM NOZZLE AND CONDUCTANCE SENSOR

FIELD OF THE INVENTION

This invention relates in general to the field of automated and/or robotic assembly devices, and more specifically to those devices comprising vacuum nozzles capable of sensing the presence of an assembly component.

BACKGROUND OF THE INVENTION

Automated assembly equipment, including robotic assembly equipment, commonly picks and places assembly components using some form of sensing mechanism to determine the presence of the assembly component at an end effector. When picking and placing the assembly component using a vacuum nozzle, typically a conventional vacuum sensor detects a change in air pressure at the nozzle that indicates the presence of the assembly component.

Regrettably, when the assembly component shape and dimensions are substantially different than the shape and dimensions of the nozzle (e.g. an airwound coil or a spring), the change in air pressure in many instances is not sufficient to reliably indicate the presence of the assembly component. This condition oftentimes is a significant cause of assembly and manufacturing failures. If the assembly component is not reliably detected and assembled during factory production, the quality of the manufactured product may be severely affected as perceived by the consumer.

Alternately, a proximity sensor, such as an infrared sensor, may be used to detect the presence of the assembly component. Because conventional proximity sensors tend to be relatively bulky for assembly of small components with tight assembly clearances, they are usually located at a station away from the automated assembly (e.g., robotic assembly). Unfortunately, these logistics demand that the assembly component be captured and then carried to the sensing station to determine the presence of the assembly component, adding significant time to the assembly process. Moreover, the sensing due to these conventional proximity sensors (e.g., infrared sensor), may also show high failure rates when the assembly component (e.g., a spring or an airwound coil), is small relative to the dimensions of the vacuum nozzle end effector. In many instances, the assembly component may be indistinguishable from the vacuum nozzle using these conventional proximity sensors.

SUMMARY OF THE INVENTION

In carrying out one form of this invention, there is provided an apparatus capable of automated assembly, including robotic assembly, comprising a vacuum nozzle capable of aspirating and securing an electrically conductive assembly component. The electrically conductive assembly component is electrically coupled to an electric conductance sensor for detecting the presence of the electrically conductive assembly component at the vacuum nozzle.

DESCRIPTION OF A PREFERRED EMBODIMENT

Figure 1:
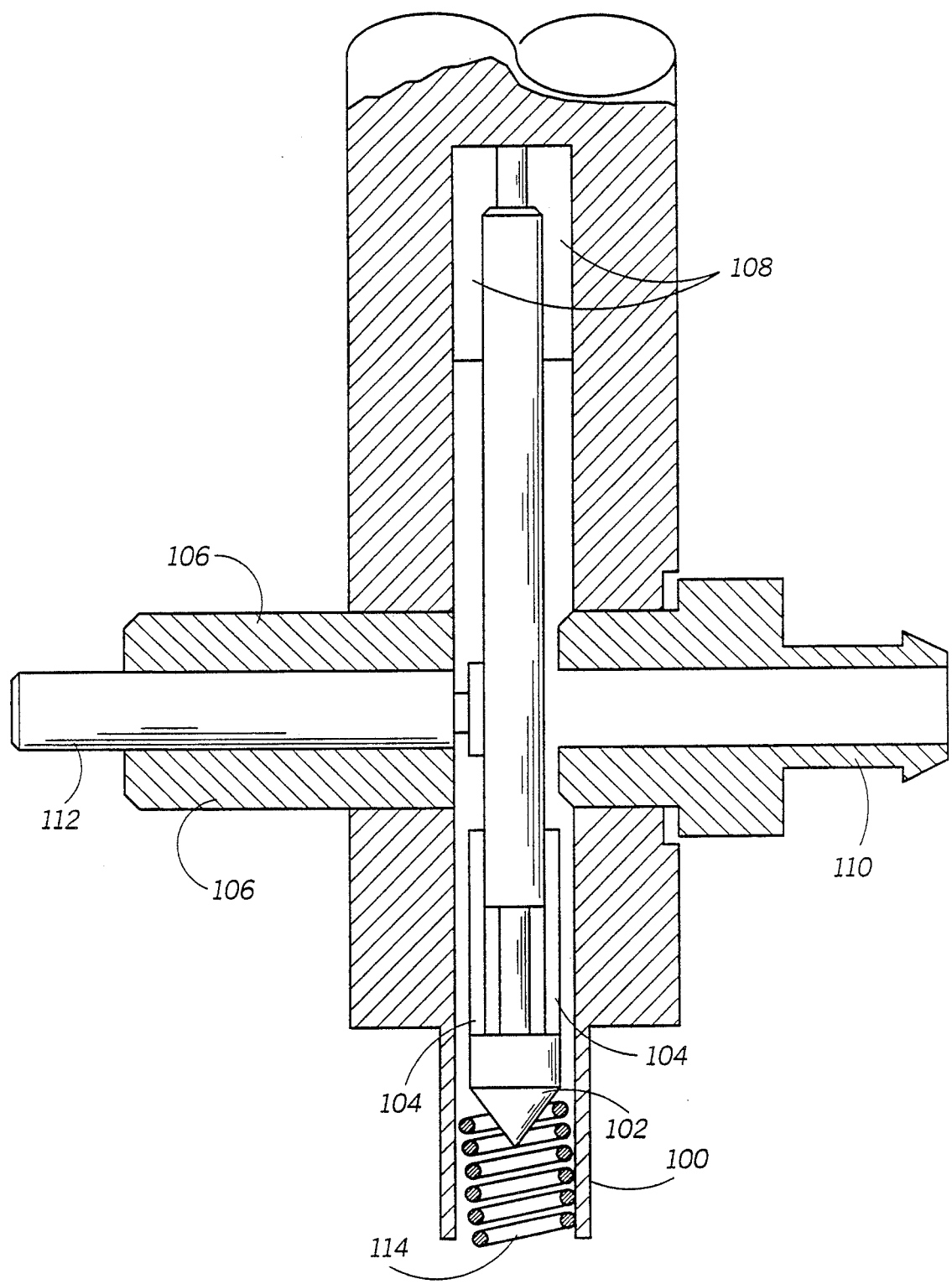
FIG. 1 is a cross-sectional view of a vacuum nozzle and electrical contact assembly in accordance with a first embodiment of the present invention.

Referring to FIG. 1, a cross-sectional side view of a vacuum nozzle 100 and electrical contact 102 assembly is shown, in accordance with a first embodiment of the present invention. The vacuum nozzle 100 is preferably constructed from a conductive material, such as copper or aluminum. The electrical contact 102 is electrically insulated from the vacuum nozzle 100 by electrical insulators 104 and 108, which may be constructed preferably from a plastic material.

The vacuum is created at the nozzle 100 with a vacuum pump (not shown), which is mechanically coupled to the vacuum nozzle 100 and electrical contact 102 assembly via vacuum connector 110. A vacuum hose (not shown) may be used to couple the vacuum pump (not shown) to the vacuum connector 110, which substantially delivers the vacuum created from the aspirating vacuum pump (not shown) to the vacuum connector 110 and consequently to the vacuum nozzle 100.

The vacuum connector 110 is constructed of a conductive material, preferably copper or aluminum, and electrically couples the vacuum nozzle 100 to a voltage source (not shown). The electrical contact 102 within the vacuum nozzle 100 is substantially concentric to the vacuum nozzle 100 and electrically couples to a conductive supporting rod 112. The supporting rod 112 is preferably constructed from copper or aluminum, and is electrically insulated from the vacuum nozzle 100 by electrical insulator 106. A second voltage source (not shown) electrically couples, via the supporting rod 112, to the electrical contact 102 which is electrically insulated from the nozzle 100. Therefore, one voltage source is electrically coupled to the vacuum nozzle 100 and a second voltage source is electrically coupled to the electrical contact 102. When an electrical circuit is created between the two voltage sources, such as when an electrically conductive assembly component 114 (e.g., a spring), electrically couples the vacuum nozzle 100 to the electrical contact 102, the presence of an electrically conductive assembly component 114 at the vacuum nozzle 100 may be sensed, as will be subsequently more fully discussed.

Figure 2:
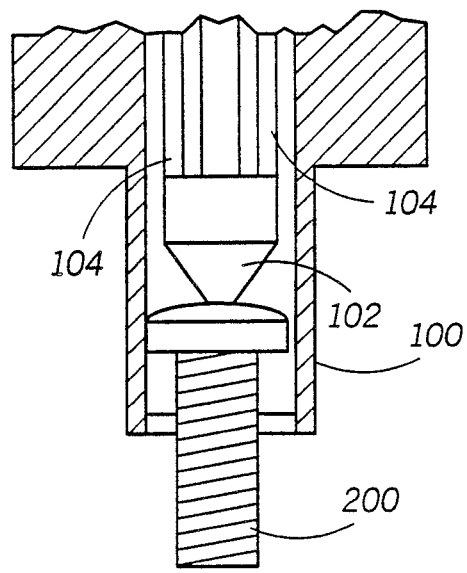
FIG. 2 is a cross-sectional view of the vacuum nozzle and electrical contact assembly of FIG. 1 securing an electrically conductive assembly component such as a Phillips or slotted head screw.

Referring to FIG. 2, a cross-sectional side view of the vacuum nozzle 100 and electrical contact 102 assembly of FIG. 1 is shown securing an electrically conductive assembly component 200 such as a Phillips or slotted head screw. A vacuum created at the vacuum nozzle 100 aspirates and substantially secures the electrically conductive assembly component 200 to the vacuum nozzle 100. An electrical circuit is created between the two voltage sources when the electrically conductive assembly component 200 electrically couples the vacuum nozzle 100 to the electrical contact 102.

The presence of the conductive assembly component 200 at the vacuum nozzle 100 may be sensed by sensing an electrical current path between the two voltage sources using a conventional electric conductance sensor (not shown). The sensing operation may be efficiently performed promptly after the assembly component 200 is secured by the vacuum nozzle 100. Therefore, the presence of the assembly component 200 may be verified before the automated assembly equipment (e.g., robotic assembly equipment), begins movement toward placement of the assembly component 200. If the assembly component 200 is sensed absent from the vacuum nozzle 100, the automated and/or robotic assembly equipment quickly picks another assembly component 200 to maintain an efficient assembly process.

Figure 3:
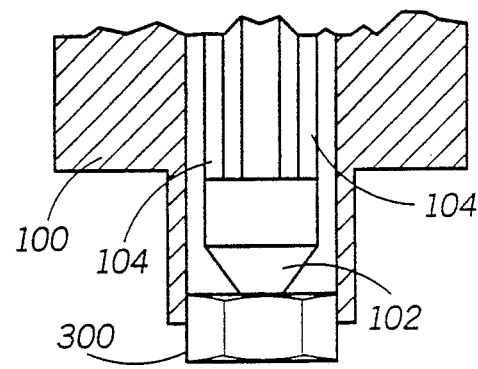
FIG. 3 is a cross-sectional view of the vacuum nozzle and electrical contact assembly of FIG. 1 in an alternate arrangement securing an electrically conductive assembly component such as a hex or square nut.

Referring to FIG. 3, a cross-sectional side view of the vacuum nozzle 100 and electrical contact 102 assembly of FIG. 1 is shown in an alternate arrangement securing an electrically conductive assembly component such as a hex or square nut 300. In this arrangement, the dimensions of the vacuum nozzle 100 are slightly altered to accommodate the shape of the hex or square nut assembly component 300. The securing and sensing mechanism is identical to that discussed for FIGS. 1 and 2.

Figure 4:
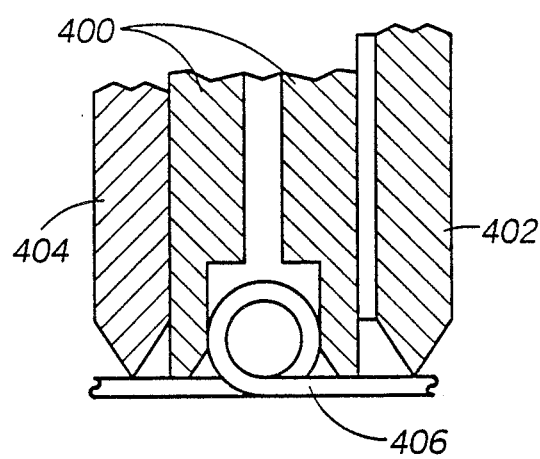
FIG. 4 is a cross-sectional view of a vacuum nozzle and two electrical contacts securing an electrically conductive assembly component such as an airwound coil in accordance with a second embodiment of the present invention.

Referring to FIG. 4, a cross-sectional side view of a vacuum nozzle 400 and two electrical contacts 402 and 404 securing an electrically conductive assembly component 406 such as an airwound coil 406 is shown, in accordance with a second embodiment of the present invention. The vacuum nozzle 400, in this embodiment, comprises electrically non-conductive material at the vacuum nozzle 400 such that the electrically conductive assembly component 406 is secured by the vacuum nozzle 400 and the electrically conductive sensing is accomplished using two electrical contacts 402 and 404 located adjacent to the vacuum nozzle 400.

Electrical contact 402 is electrically isolated from electrical contact 404. Each electrical contact 402 and 404 is electrically coupled to a respective voltage source (not shown), such that a conventional electric conductance sensor (not shown) may detect when an electrically conductive assembly component 406 creates an electrical circuit between the two electrical contacts 402 and 404. Therefore, the automated assembly equipment (e.g., robotic assembly equipment), is capable of securing and sensing the presence of the electrically conductive assembly component 406 at the vacuum nozzle 400.

What is claimed is:

1. An apparatus capable of automated assembly, comprising:
   a vacuum nozzle capable of aspirating and securing an electrically conductive assembly component to the vacuum nozzle; and
   an electric conductance sensor, comprising at least one electrical contact electrically coupled to the electrically conductive assembly component, for detecting the presence of the electrically conductive assembly component at the vacuum nozzle by sensing an electrical current path between the at least one electrical contact and the electrically conductive assembly component.

2. The apparatus of claim 1, wherein the at least one electrical contact is located within the vacuum nozzle.

3. The apparatus of claim 1, wherein the at least one electrical contact is located adjacent to the vacuum nozzle.

4. An apparatus capable of automated assembly, comprising:
   a vacuum nozzle capable of aspirating and securing an electrically conductive assembly component; and
   an electric conductance sensor, electrically coupled to the electrically conductive assembly component, for detecting the presence of the electrically conductive assembly component at the vacuum nozzle, the electric conductance sensor comprising at least one electrical contact located within the vacuum nozzle to detect the presence of the electrically conductive assembly component by sensing an electrical current path between the at least one electrical contact and the electrically conductive assembly component.

5. The apparatus of claim 4, wherein the electric conductance sensor detects the presence of the electrically conductive assembly component by sensing an electrical current path between the at least one electrical contact, the electrically conductive assembly component, and the vacuum nozzle.

6. The apparatus of claim 4, wherein the vacuum nozzle comprises an electrical insulator adjacent to the at least one electrical contact.

7. The apparatus of claim 4, further comprising an electrical insulator disposed between the at least one electrical contact and the vacuum nozzle wall.

8. An apparatus capable of automated assembly, comprising:
   a vacuum nozzle capable of aspirating and securing an electrically conductive assembly component; and
   an electric conductance sensor, electrically coupled to the electrically conductive assembly component, for detecting the presence of the electrically conductive assembly component at the vacuum nozzle, the electric conductance sensor comprising at least one electrical contact located adjacent to the vacuum nozzle to detect the presence of the electrically conductive assembly component by sensing an electrical current path between the at least one electrical contact and the electrically conductive assembly component.

9. The apparatus of claim 8, further comprising an electrical insulator disposed between the at least one electrical contact and the vacuum nozzle wall.

10. The apparatus of claim 8, wherein the electric conductance sensor detects the presence of the electrically conductive assembly component by sensing an electrical current path between the at least one electrical contact, the electrically conductive assembly component, and the vacuum nozzle.

11. The apparatus of claim 8, wherein the vacuum nozzle comprises an electrical insulator adjacent to the at least one electrical contact.

12. A method for automated assembly using a vacuum nozzle having at least one electrical contact coupled thereto, comprising the steps of:
   aspirating and securing an electrically conductive assembly component to the vacuum nozzle; and
   sensing the presence of the electrically conductive assembly component at the vacuum nozzle by sensing an electrical current path between the at least one electrical contact and the electrically conductive assembly component.

13. The method of claim 12, wherein the sensing step further comprises the step of electrically coupling the electrically conductive assembly component to the at least one electrical contact.

14. A robotic end effector and electrically conductive assembly component sensor system, comprising:

a vacuum nozzle capable of aspirating and securing an electrically conductive assembly component thereto;

at least one electrical contact electrically insulated from the vacuum nozzle; and means for sensing the presence of the electrically conductive assembly component secured to the vacuum nozzle by confirming an electrical current path between the electrically conductive assembly component and the at least one electrical contact.

15. The apparatus of claim 14, further comprising an electrical insulator disposed between the at least one electrical contact and the vacuum nozzle wall.

16. The apparatus of claim 14, wherein the means for sensing the presence of the electrically conductive assembly component is confirmed by sensing an electrical current path between the at least one electrical contact, the electrically conductive assembly component, and the vacuum nozzle.

17. The apparatus of claim 14, wherein the vacuum nozzle comprises an electrical insulator adjacent to the at least one electrical contact.

* * * * *